UNITED STATES PATENT OFFICE.

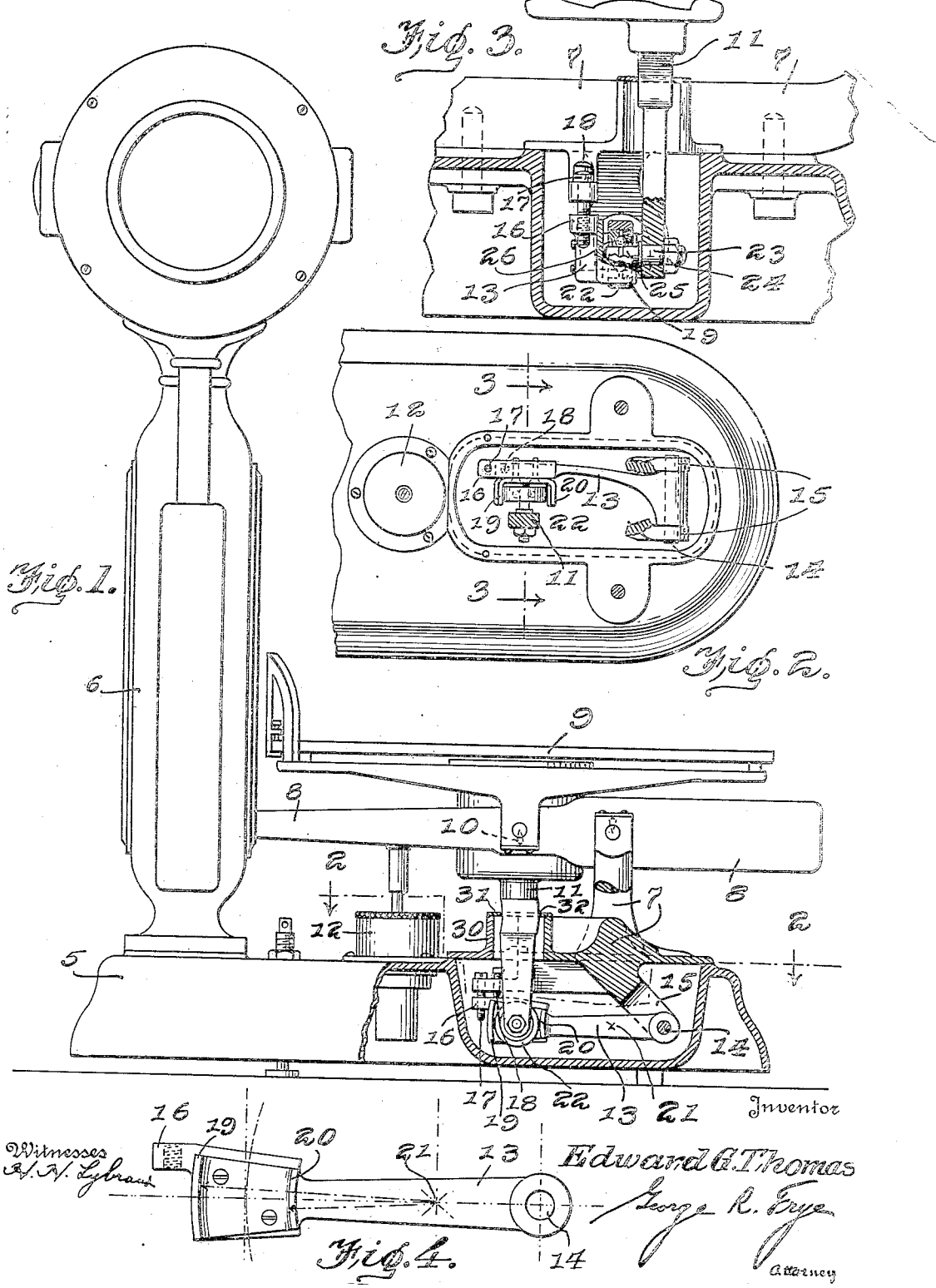
E. G. THOMAS.
CHECK LINK MECHANISM.
APPLICATION FILED FEB. 1, 1918.
1,404,809.
Patented Jan. 31, 1922.
2 SHEETS—SHEET 1.

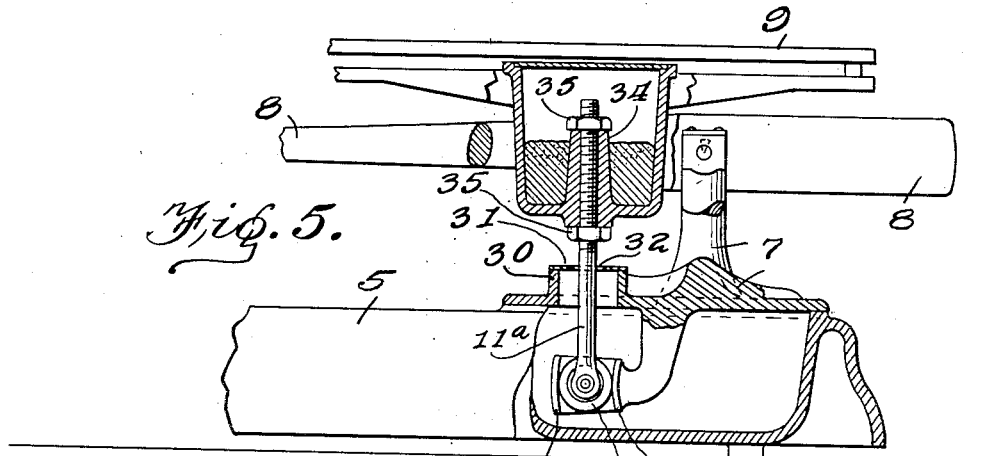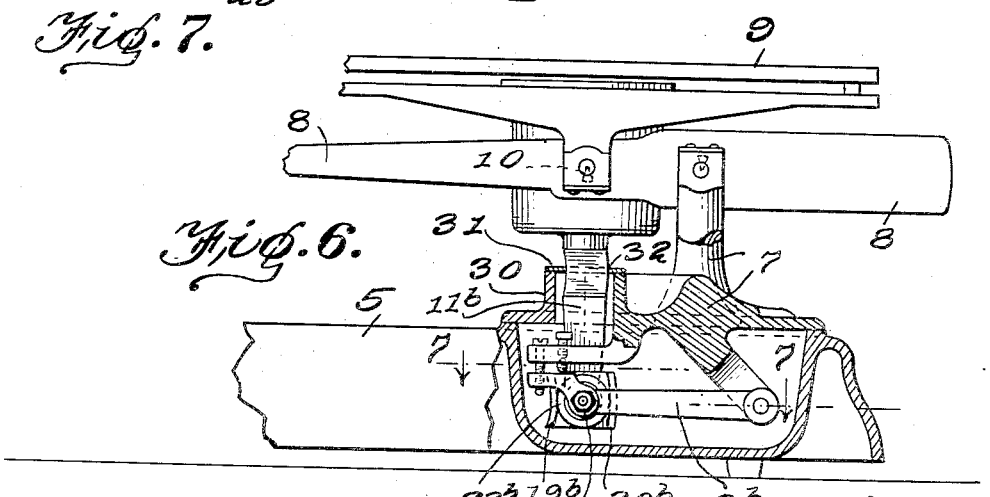

EDWARD G. THOMAS, OF TOLEDO, OHIO, ASSIGNOR TO TOLEDO SCALE COMPANY, OF TOLEDO, OHIO, A CORPORATION OF OHIO.

CHECK-LINK MECHANISM.

1,404,809.   Specification of Letters Patent.   Patented Jan. 31, 1922.

Application filed February 1, 1918. Serial No. 214,804.

*To all whom it may concern:*

Be it known that I, EDWARD G. THOMAS, a citizen of the United States, residing at Toledo, in the county of Lucas and State of Ohio, have invented certain new and useful Improvements in Check-Link Mechanism, of which the following is a specification.

This invention relates to weighing scales, and more particularly to that type of weighing scales having a scale beam supporting a platter or like commodity-receiving means upon two bearing pivots, such scales being familiarly known as counter scales and used upon the counters of stores, shops, factories, and the like. In scales of this type having the platter supported on two-point bearings it is necessary to employ a check link mechanism in connection with the scale beam to prevent tipping of the platform when the load to be weighed is placed adjacent the edges thereof. The check link mechanism heretofore employed has consisted of a check rod or link pivotally attached to a check post secured to the base or other stationary part of the scale frame and a post carried by the scale platter, this check link being of the same length as the distance between the fulcrum and platform-supporting pivots. The distance between the line passing through the knife edges of the fulcrum pivots and the point of attachment of the check link to the stationary check post is made equal to the distance from a line passing through the knife edges of the platform-supporting pivots and the point of attachment of the check link to the post carried by the scale platter. As long as the setting of the points of attachment of the check link remain as described above, the line of strain in this check link will be parallel to a plane passing through the knife edges of the fulcrum and platform-supporting pivot, and the strain in the check link caused by the placing of a commodity away from the vertical line passing through the platform-supporting pivots cannot have a vertical component tending to raise or lower the platform, and the scale when so adjusted will weigh as accurately when the load is away from the center of the platform as when it is in a vertical line passing over the platform-supporting pivots. If, however, for any reason, such as the shrinking of the metal, the wearing of the pivots, or the accidental slipping of adjustments, the parallelogram is destroyed, the scale will inaccurately indicate the weight of a commodity placed on the platform at a point away from the pivot line thereof, this inaccuracy becoming greater as the departure from a true parallelogram increases.

It is the object of the present invention to overcome the inaccuracy of this indication and to provide a construction whereby the desired results may be obtained and the parallelogram remain constant despite the ordinary changes resulting from use and wear. In the present construction means are provided for automatically correcting some inaccuracies, such as the wearing of the platform-supporting pivots, the settling of the cement of these pivots, etc., and for manually adjusting the position of the link to correct for other inaccuracies, such as the wear or settling of the fulcrum pivots, etc.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating preferred embodiments of my invention and wherein similar reference numerals designate similar parts throughout the several views.

In the drawings:—

Figure 1 is a side elevation of a weighing scale equipped with my improved check link, parts being broken away and shown in section;

Figure 2 is a detail plan view taken substantially on the line 2—2 of Figure 1;

Figure 3 is a vertical sectional view taken on the line 3—3 of Figure 2;

Figure 4 is an enlarged detail view of the check link;

Figure 5 is a detail vertical section of another adaptation of my invention;

Figure 6 is a similar view through a third form of my improved check link mechanism; and Figure 7 is a detail horizontal section taken substantially on the line 7—7 of Figure 6.

First describing the modification shown in Figures 1–4 inclusive, the numeral 5 designates the base of the scale and 6 the housing thereof. Formed on the base 5 are the usual base horns 7 supporting the scale beam 8. The platter 9 is pivotally mounted upon the scale beam and upon the upwardly-extending pivots 10, and carries the rod 11 in alignment with such pivots which extends through an aperture in the base 5. A dash pot 12 mounted upon the base forwardly of the platter is connected with the scale beam in the usual manner. My check link mechanism is positioned within the base 5 and comprises a link 13 pivoted as at 14 between lugs 15 extending downwardly from the upper portion of the base 5 (see Fig. 2). It will be noted that the point of pivoting the link 13 is further removed from the post connected with the platter than a plane in vertical alignment with the fulcrum pivots of the scale beam, whereby a longer movement of the link may be secured whenever adjustment is desired. At its opposite end the link 13 is provided with a threaded lug 16 adapted to receive a vertical bolt 17 inserted through a lug upon the base 5 and arranged whereby movement of the bolt in one direction will swing the link upwardly on its pivot 14 and rotation in the opposite direction will correspondingly lower the link. Suitable means may be provided for locking the bolt in any desired position to maintain any particular adjustment. To insure the lowering of the link when desired and to provide an anchor to prevent slight movements of the link, a second bolt or screw 18 is provided (see Fig. 1). Intermediate its ends the link 13 is provided with a pair of curved walls 19 and 20, each of which is formed as a true arc of a circle struck from the same central point 21 (see Figs. 1 and 4). These curved walls are contacted by the periphery of the roller 22 (see Fig. 1) mounted on a pintle 23 on the lower extremity of the post 11. The radius of the curved wall 19 is equal to the distance between the knife edges of the fulcrum pivot and platform-supporting pivot plus one-half the diameter of the roller 22, while the radius of the curved wall 20 is equal to the distance between the knife edges of the fulcrum pivot and the platform-supporting pivot minus one-half the diameter of the roller 22, these dimensions being amended in the construction of the device to provide for a clearance between the roller and the walls of approximately one thousandth of an inch in order that the roller may be in contact with one wall 19 or 20 only at a time. The pintle 23 is arranged and secured in position by a nut 24 substantially as shown in Fig. 3, one portion thereof carrying a ball-race 25 co-operating with the ball bearings 26, the roller 22 carrying the outer bearing race. Thus, the roller 22 is mounted in a practically frictionless manner on the post 11 and when traversing the race-way between the curved walls 19 and 20 its center, and therefore the post 11 at the point where the roller 22 is pivoted, will follow a true arc of a circle about the point 21, the radius of this circle being equal to the distance between the knife edges of the fulcrum and platform-supporting pivots. By adjusting the position of the link 13 to a point where the distance between the fulcrum pivot and the point 21 is equal to the distance between the platform-supporting pivots and the center of the roller 22, a line connecting the point 21 to the center of the roller 22 will at all times be parallel and equal to a line connecting it to the fulcrum and platform-supporting pivots, and a direct parallelogram of forces will be established. Should for any reason the platform fall, as, for example, when the platform-supporting pivot wears or its supporting cement contracts, the roller 22 will fall to the same extent without disturbing the parallelogram originally secured by adjusting the position of the link 13. Should, however, for any reason the fulcrum pivots fall, thus lowering the scale beam, it will be necessary to restore the parallelogram by lowering the point 21 in the link 13 (the center on which the curved walls 19 and 20 are struck). This lowering is effected by proper rotation and adjustment of the bolts 17 and 18. These falling movements of the platform post and scale beam are the movements which have heretofore seriously affected, if not destroyed, the accuracy of scales of this type. In scales wherein the check link mechanism is pivotally secured to the platform post the falling of this post will immediately destroy the predetermined parallelogram and the only means of restoring the same would be to re-arrange the post in its original position. This is one of the most frequent causes of inaccurate scales, and in my improved check link mechanism it is possible for correction to be made simply and quickly without in any way affecting the adjustment of the scale parts.

In Figure 5 I have shown a construction wherein the adjustments for all changes in the parallelogram may be made by moving the roller itself. The curved walls 19$^a$ and 20$^a$ are struck from the same center as the walls 19 and 20 heretofore described, but are securely fastened to or formed as a part of the base 5, thereby assuming a position which can be considered fixed for the purposes of guiding the platform and connected parts. The roller 22$^a$ is journalled at the lower extremity of the platform post and fits between the curved walls of the guide member substantially as in the first described modification. When, however, it is desired to correct for the falling of the fulcrum pivots or such changes as would lower the scale beam, the correcting adjustment may be made by lowering or raising the roller 22 as desired. To enable this the platform post 11ᵃ is threaded at its upper extremity and extends through an elongated sleeve 34 on the scale beam, being held in any desired vertical position through the co-operation of lock nuts 35.

In Figures 6 and 7 is illustrated a construction wherein the guide roller is stationary and the curved walls co-operating therewith arranged on movable members. Thus, the roller 22ᵇ is mounted on a pintle 23ᵇ secured in the link 13ᵇ, this link being mounted within the base substantially as is the link 13 in the first described modification. The curved walls 19ᵇ and 20ᵇ are secured upon the platform post 11ᵇ, the curved surfaces being struck so that their arcuate faces are substantially identical with the similar faces of the walls 19 and 20 in the first described modification. The operation will thus be identical with that of the first described modification, the only difference being that the roller is fixed in one and the curved guiding walls are fixed in the other modification.

It is very desirable to keep dust away from all portions of the scale, and the check link mechanism illustrated in my drawings is therefore enclosed as completely as possible by the base 5, the base horn 7 and a removable cover 30, the casting being so shaped as to provide a tubular portion extending upward vertically around the post 11 but of such dimensions as not to come in contact with it during its vertical movements. Each part of the platform and post 11 moves during the travels of the scale beam in a portion of a circle of a radius equal to the distance between the fulcrum and platform-supporting pivots. That portion of the post 11 which is at the general level at the top of the tubular portion of the base of the scale is made of rectangular section having those sides parallel which are at right angles to the lines of pivots and having those sides which are parallel to the lines of pivots so shaped that their contours are portions of circles whose radius is equal to the distance between the fulcrum and platform-supporting pivots, the center of the circular portion being on the side of the platform-supporting pivot which is away from the fulcrum pivot. A dust washer 31 having an opening 32 of which the contour corresponds closely to the section of the post 11 at the point where it is shaped as above rests upon the top of the tubular portion of the base and because of the shape of the post 11 at this level it will move freely up and down through dust washer 31 without causing any horizontal translation of said dust washer and therefore without causing any frictional resistance to the motion of the scale beam.

It will be noted that for the use of my check link mechanism it is only necessary that the scale beam support the platform on two bearing pivots, and such scale beam can be employed with any of the well-known types of weighing machines, such as spring, pendulum, pick-up weight, and other weight-offsetting devices.

In operation, the inner end of the scale beam 8 within the housing 6 is connected with a steelyard rod, etc. through which engagement is made with the pendulum or other load-offsetting mechanism. The placing of the commodity to be weighed upon the platform 9 will cause the inner end of the scale beam to swing downwardly, exerting a pull upon the steelyard rod to operate the pendulum or other load-offsetting mechanism to counterbalance the weight of such commodity, and through suitable indicating means the weight of the load is shown.

While it will be apparent that the illustrated embodiments of my invention herein shown are well adapted to adequately fulfill the objects and advantages primarily set forth, it is to be understood that the invention is susceptible to variation, modification and change without departing from the spirit and scope of the invention as set forth in the subjoined claims.

Having described my invention, I claim:

1. In a device of the class described, in combination, a base, a scale beam fulcrumed thereon, a platform pivotally supported on the scale beam, and a check link mechanism comprising a stationary guiding member secured to the base and having a guiding channel curved about an axis parallel to the axis of the pivot supporting the platform, and a co-operating member secured to the platform.

2. In a check link mechanism for scales, the combination of a base, a scale beam fulcrumed thereon, a platform pivotally supported on the beam, a stationary guiding member having a channel curved about an axis parallel to the axis of the pivot supporting the platform, and a member attached to the platform and co-operating with said guiding member.

3. In a check link mechanism for scales, the combination of a base, a scale beam fulcrumed thereon, a platform pivotally supported on the beam, a member attached to said platform and located at an altitude differing from that of the platform-supporting pivot, and means for guiding said member along a circular arc of a radius equal to the distance between the edges of the fulcrum and platform-supporting pivots, including a stationary member formed with a channel having curved walls.

4. In a check link mechanism for scales, the combination of a base, a scale beam fulcrumed thereon, a platform pivotally supported on the beam, and a check link mechanism comprising an adjustable guiding member and a member having curved parallel walls attached to the platform and adapted to engage with said guiding member.

5. In a check link mechanism for scales, the combination of a base, a scale beam fulcrumed thereon, a platform pivotally supported on the beam, and a check link comprising two curved concentric walls attached to the base and a roller secured to the platform and arranged to move between said walls.

6. In a check link mechanism for scales, the combination of a base, a scale beam fulcrumed thereon, a platform pivotally supported on the beam, a check link mechanism comprising two vertically-adjustable concentric walls attached to the base, and a member secured to the platform and adapted to move between said walls and be guided thereby.

7. In a check link mechanism for scales, four members arranged to form a deformable parallelogram, two of said members being movable and two stationary during the operation of the scale.

8. In a check link mechanism for scales, four members including the scale beam arranged to form a deformable parallelogram, the scale beam and one other member being movable and the remaining members stationary during the operation of the scale.

9. In a check link mechanism for scales, the combination of a base, a scale beam fulcrumed thereon, a platform pivotally supported on said beam, and a check link mechanism consisting of a pivoted member carrying two curved concentric walls, means for adjusting the vertical position of said walls, and a member secured to said platform moving between and adapted to be guided by said walls.

10. In a check link mechanism for scales, the combination of a base, a scale beam fulcrumed thereon, a platform pivotally supported upon said beam, a dust washer, a member secured to said platform and projecting through said dust washer, stationary guide means for said member attached to said base, said member having a portion of its length so shaped as to move vertically through said dust washer without disturbing the horizontal location thereof.

EDWARD G. THOMAS.

Witnesses:
H. H. LYBRAND,
A. H. BEELEY.